(12) United States Patent
Ambrosino et al.

(10) Patent No.: US 10,728,047 B2
(45) Date of Patent: Jul. 28, 2020

(54) TRANSCEIVER DEVICE FOR PROVIDING WIRELESS CONNECTIVITY TO A PROTECTION AND CONTROL DEVICE

(71) Applicant: ABB S.p.A., Milan (IT)

(72) Inventors: Andrea Ambrosino, Treviolo (IT); Luca Lanzoni, Mozzo (IT)

(73) Assignee: ABB S.P.A., Milan (IT)

( * ) Notice: Subject to any disclaimer, the term of this patent is extended or adjusted under 35 U.S.C. 154(b) by 0 days.

(21) Appl. No.: 16/272,242

(22) Filed: Feb. 11, 2019

(65) Prior Publication Data

US 2019/0253267 A1 Aug. 15, 2019

(30) Foreign Application Priority Data

Feb. 9, 2018 (EP) ..................... 18155965

(51) Int. Cl.
*H04L 12/10* (2006.01)
*H04B 3/54* (2006.01)
(Continued)

(52) U.S. Cl.
CPC ............ *H04L 12/10* (2013.01); *G06F 1/26* (2013.01); *H02H 1/0061* (2013.01); *H02H 9/045* (2013.01); *H02J 1/10* (2013.01); *H02J 7/34* (2013.01); *H02J 13/00* (2013.01); *H04B 3/54* (2013.01); *H04B 1/38* (2013.01); *H04B 2203/5483* (2013.01)

(58) Field of Classification Search
CPC ........ G06F 1/26; H02H 1/0061; H02H 9/045; H02J 1/10; H02J 7/34; H02J 13/00; H04B 1/38; H04B 3/54; H04B 2203/5483; H04L 12/10

See application file for complete search history.

(56) References Cited

U.S. PATENT DOCUMENTS 5,629,645 A * 5/1997 Okajima ........... H04L 25/03834
327/399
2003/0147420 A1 8/2003 Beckwith
(Continued)

OTHER PUBLICATIONS

European Patent Office, Extended Search Report issued in corresponding Application No. 18155965.9, dated Apr. 3, 2018, 8 pp.

*Primary Examiner* — Syed Haider
(74) *Attorney, Agent, or Firm* — Taft Stettinius & Hollister LLP; J. Bruce Schelkopf

(57) ABSTRACT

A transceiver device comprises a transceiver unit including an RF antenna, a serial communication port operatively coupleable with a further corresponding serial communication port of a protection and control device, a serial communication bus electrically connected between said serial communication port and said transceiver unit and having a transmission line and a reception line, a battery unit, and a feeding unit to feed said transceiver unit with a feeding voltage. The feeding unit comprises a first power supply stage electrically connected with said battery unit to harvest electric power from said battery unit and a second power supply stage electrically connected with the transmission line of said serial communication bus to harvest electric power from said transmission line, when said transmission line is said stand-by condition and takes an high-level voltage value.

22 Claims, 5 Drawing Sheets

(51) Int. Cl.
   *H02J 1/10*   (2006.01)
   *H02J 7/34*   (2006.01)
   *H02H 1/00*   (2006.01)
   *G06F 1/26*   (2006.01)
   *H02J 13/00*  (2006.01)
   *H02H 9/04*   (2006.01)
   *H04B 1/38*   (2015.01)

(56) References Cited

U.S. PATENT DOCUMENTS

| | | | |
|---|---|---|---|
| 2007/0242644 A1* | 10/2007 | Yang | H03F 3/24 |
| | | | 370/338 |
| 2009/0295230 A1* | 12/2009 | Rousu | H02J 7/0068 |
| | | | 307/80 |
| 2010/0194548 A1* | 8/2010 | Tabor | H04B 3/36 |
| | | | 340/425.1 |
| 2015/0340082 A1* | 11/2015 | Yamamoto | G11C 5/025 |
| | | | 365/51 |

* cited by examiner

TRANSCEIVER DEVICE FOR PROVIDING WIRELESS CONNECTIVITY TO A PROTECTION AND CONTROL DEVICE

CROSS-REFERENCE TO RELATED APPLICATIONS

The present application claims the benefit of and priority to European Patent Application No. 18155965.9 filed Feb. 9, 2018.

STATEMENT REGARDING FEDERALLY SPONSORED RESEARCH OR DEVELOPMENT (Not Applicable)

THE NAMES OF THE PARTIES TO A JOINT RESEARCH AGREEMENT (Not Applicable)

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (Not Applicable)

STATEMENT REGARDING PRIOR DISCLOSURES BY THE INVENTOR OR A JOINT INVENTOR (Not Applicable)

FIELD OF THE INVENTION

The present invention relates to the field of low-voltage electric installations. More particularly, the present invention relates to a transceiver device to provide wireless connectivity to a protection and control device for low-voltage electric systems.

BACKGROUND

For the purposes of the present application, the term "low-voltage" (LV) relates to voltages lower than 1 kV AC and 1.5 kV DC.

Low-voltage electric installations normally include switching devices, such as automatic circuit breakers, disconnectors or contactors, which are conceived to manage operation of specific parts of an electrical system operatively associated therewith.

Typically, switching devices comprise or are operatively associated with auxiliary devices adapted to perform protection functions, control functions and/or monitoring functions.

Said auxiliary devices (commonly known as "protection and control devices") may be mounted on board said switching devices or, less frequently, arranged as stand-alone devices (e.g. mounted on a switchboard panel).

As is known, protection and control devices often need to communicate with external mobile computerised devices (e.g. a handheld or laptop computers, tablets, smartphones and the like) to carry out some relevant functionalities, e.g. configuring their own protection parameters or locally downloading/uploading stored data.

To this aim, modern protection and control devices are typically provided with a communication port operatively coupleable, in a removable manner, with a corresponding transceiver device adapted to establish a wireless communication channel between the control unit of the protection and control device and an external computerised device.

In currently available solutions, the transceiver device, which in practice works as a dongle, is normally fed by batteries. This poses relevant limitations to its useful operating life as said batteries must necessarily have a relatively small size and therefore cannot store large amount of electric energy.

On the other hand, arranging an internal feeding line in the protection and control device to feed the transceiver device, when this latter is coupled with said communication port (as it occurs in commercially available desktop or laptop computers), results relatively expensive and poses some issues in terms of electric safety.

BRIEF SUMMARY OF THE INVENTION

It is an object of the present invention to provide a transceiver device for a protection and control device intended to be installed in low voltage systems, which allows overcoming or mitigating the above-mentioned problems.

More in particular, it is an object of the present invention to provide a transceiver device capable of efficiently operating for prolonged periods of time.

A further object of the present invention is to provide a transceiver device easy and cheap to manufacture and assembly at industrial level.

In order to achieve these aim and objects, the present invention provides a transceiver device, according to the following claim 1 and related dependent claims.

The transceiver device, according to the invention, is adapted to be operatively coupled with a protection and control device for electric power distribution systems to provide wireless connectivity to said protection and control device.

According to a general definition, the transceiver device of the invention comprises:

a transceiver unit including a RF antenna;

a serial communication port operatively coupleable with a further corresponding serial communication port of said protection and control device;

a serial communication bus electrically connected between said serial communication port and said transceiver unit. Said serial communication bus has a transmission line and a reception line. In operation, said transmission line takes a high-level voltage value, when it is in a stand-by condition, and takes a low-level voltage value, when it is in an active condition;

a battery unit;

a feeding unit to feed said transceiver unit with a feeding voltage.

Said feeding unit comprises a first power supply stage electrically coupled with said battery unit to harvest electric power from said battery unit and a second power supply stage electrically coupled with the transmission line of said serial communication bus to harvest electric power from said transmission line, when said transmission line is in said stand-by condition and takes an high-level voltage value.

According to an aspect of the invention, said feeding unit comprises a voltage switching stage electrically connected with said first and second power supply stages to receive a first voltage from said first power supply stage and a second voltage from said second power supply stage. Said voltage switching stage is adapted to select said first voltage or said second voltage as the feeding voltage to feed said transceiver unit.

According to an aspect of the invention, said transceiver unit is adapted to make said voltage switching stage to select said first voltage or said second voltage as said feeding voltage depending on an average value taken by the feeding voltage received by said transceiver unit.

Preferably, said transceiver unit is adapted to:

check the average value of said feeding voltage received from said voltage switching stage;

make said voltage switching stage to select said second voltage as said feeding voltage, if the average value of said feeding voltage is not lower than a threshold voltage value;

make said voltage switching stage to select said first voltage as said feeding voltage, if the average value of said feeding voltage is lower than said threshold voltage value.

According to an aspect of the invention, said transceiver unit is adapted to make said voltage switching stage to select said first voltage or said second voltage depending on the operating conditions of said protection and control device.

Preferably, said transceiver unit is adapted to:

acquire information on the operating conditions of said protection and control device;

check whether said protection and control device is fed by one or more current transformers operatively associated to an electric line or by an auxiliary power supply;

make said voltage switching stage to select said second voltage as said feeding voltage, if said protection and control device is fed by said auxiliary power supply;

check the value of a line current flowing along said electric line, if said protection and control device is fed by said current transformers;

make said voltage switching stage to select said second voltage as said feeding voltage, if the value of said line current is not lower than a threshold current value;

make said voltage switching stage to select said first voltage as said feeding voltage, if the value of said line current is lower than a threshold current value.

According to an embodiment, said voltage switching stage is adapted to select the highest of the first and second voltages as said feeding voltage.

According to another embodiment, said voltage switching stage is adapted to select said first voltage or said second voltage as said feeding voltage in response to selection signals received from said transceiver unit.

According to an aspect of the invention, said first power supply stage comprises a battery switch circuit electrically coupled with said battery unit and a voltage regulation circuit electrically coupled between said battery switch circuit and said voltage switching stage. Said battery switch circuit is adapted to electrically connect or disconnect said battery unit with or from said first power supply stage.

Preferably, said battery switch circuit electrically connects or disconnects said battery unit with or from first power supply stage in response to enabling signals received from said transceiver unit. According to an aspect of the invention, the transceiver device comprises a power switch that can be operated by a user between a switch-on position, at which said transceiver device is activated, and a switch-off position, at which said transceiver device is deactivated.

Preferably, said power switch enables said battery switch circuit to electrically connect said battery unit with said voltage regulation circuit, when said power switch is operated from said switch-off position to said switch-on position.

According to an aspect of the invention, the transceiver device comprises a battery charging unit electrically coupled with said battery unit.

Preferably, said battery charging unit comprises a power supply port electrically coupleable with an external electric power source and a battery charging stage electrically connected between said power supply port and said battery unit.

According to an aspect of the invention, said second power supply stage comprises a coupling circuit electrically connected with the transmission line of said serial communication bus and a storage circuit electrically connected between said coupling circuit and said voltage switching stage.

According to an aspect of the invention, the transceiver device comprises a signalling unit to provide light signals indicative of the operating status of said transceiver device and of said protection and control device.

According to an aspect of the invention, said transceiver unit is adapted to carry out a first control procedure including the following steps:

receiving a query message to be transmitted to said protection and control device from an external computerised device;

checking whether the length of a response message to be transmitted to said external computerised device in response to said query message;

if the length of said response message is longer than a given threshold length, dividing said query message in a plurality of sub-query messages;

transmitting said plurality of sub-query messages to said protection and control device in substitution of the query message received from said external computerised device.

According to an aspect of the invention, said transceiver unit is adapted to carry out a second control procedure including the following steps:

receiving one or more data packets to be transmitted to said computerised electronic device from said protection and control device;

storing the received data packets in a memory;

checking the operating status the transmission line of said serial communication bus;

transmitting the stored data packets to said computerised device, if the transmission line of said serial communication bus stably remains in a stand-by condition;

repeating the previous steps, if the transmission line of said serial communication bus does not stably remain in a stand-by condition.

In a further aspect, the present invention relates to a protection and control device according to the following claim 16.

Further characteristics and advantages of the present invention will emerge from the description of preferred, but not exclusive, embodiments, non-limiting examples of which are provided in the attached drawings, wherein:

DETAILED DESCRIPTION OF THE INVENTION

Figure 1:
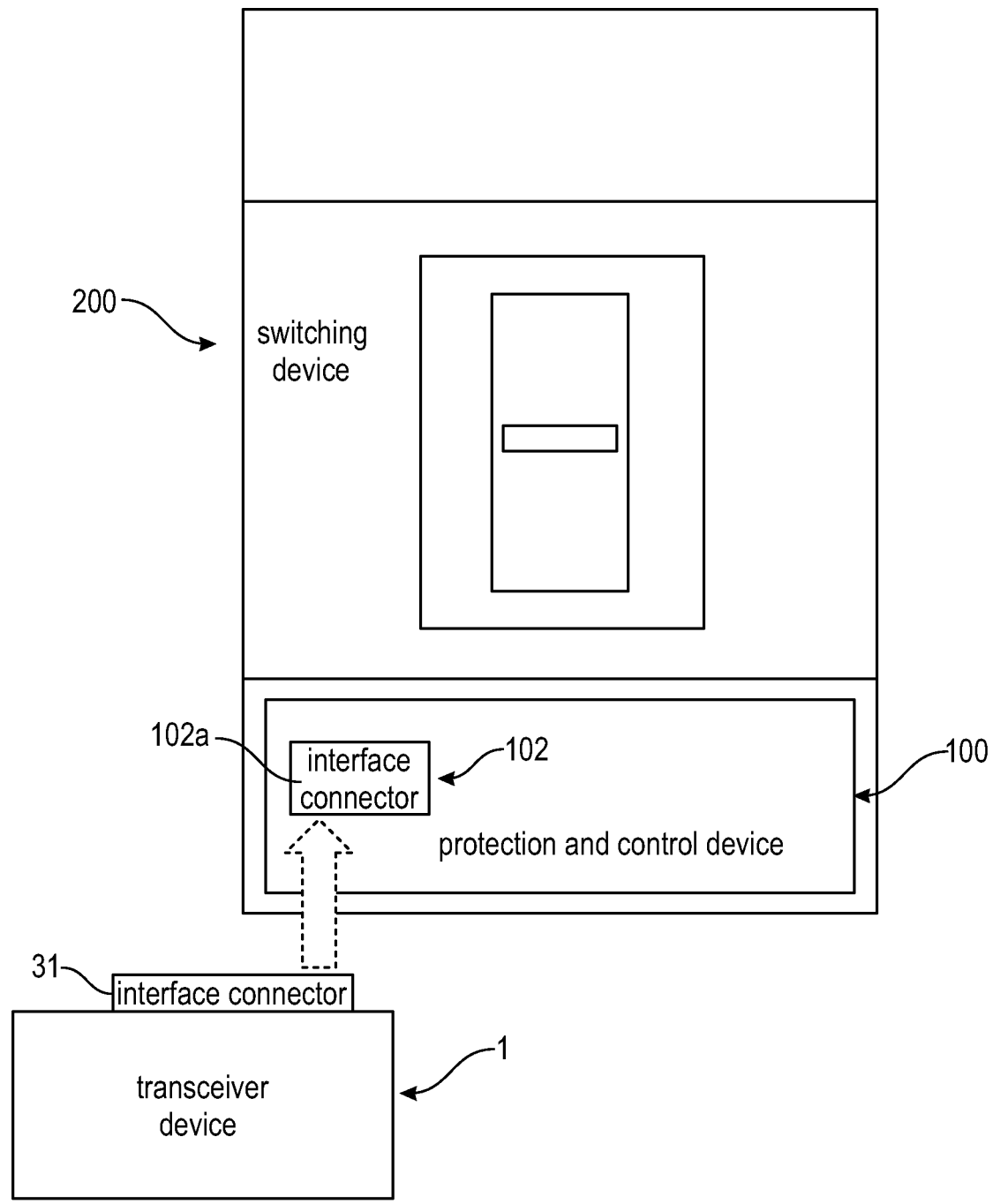
FIG. 1 shows a schematic view of a low-voltage switching device including a protection and control device operatively coupleable with the transceiver device, according to the invention.

Referring to the cited figures, the present invention relates to a transceiver device 1 operatively coupleable, preferably in a removable manner, with a protection and control device 100 for low voltage electric installations.

The protection and control device 100 is adapted to carry out protection functions, control functions and/or monitoring functions to manage operation of an electric system, e.g. a portion of electric power distribution grid or a switchboard.

The protection and control device 100 comprises a main control unit 101 adapted to manage its functionalities.

Preferably, the main control unit 101 comprises digital data processing resources (e.g. microprocessors, DSPs or the like) configured to execute stored software instructions to carry out the functionalities request for said control unit.

The protection and control device 100 comprises a first serial communication port 102 and a first serial communication bus 103 electrically coupled between the control unit 101 and the communication port 102.

The communication port 102 is intended to be operatively coupled (i.e. mechanically and electrically coupled), preferably in a removable manner, with a corresponding serial communication port of another electronic device (e.g. of the transceiver device 1).

To this aim, the communication port 102 conveniently comprises an interface connector 102a, preferably a female connector, arranged to be accessible by a user at an external surface of the protection and control device 100 (FIG. 1). The interface connector 102a is mechanically and electrically coupleable, preferably in a removable manner, with a corresponding interface connector of another electronic device.

Preferably, the interface connector 102a is of the USB type.

Preferably, the communication port 102 includes a bus converter or other circuit arrangements of similar type (not shown) to suitably interface with the communication bus 103.

The communication bus 103 comprises a pair a distinct communication lines, namely a transmission line and a reception line (not shown).

Figure 4:
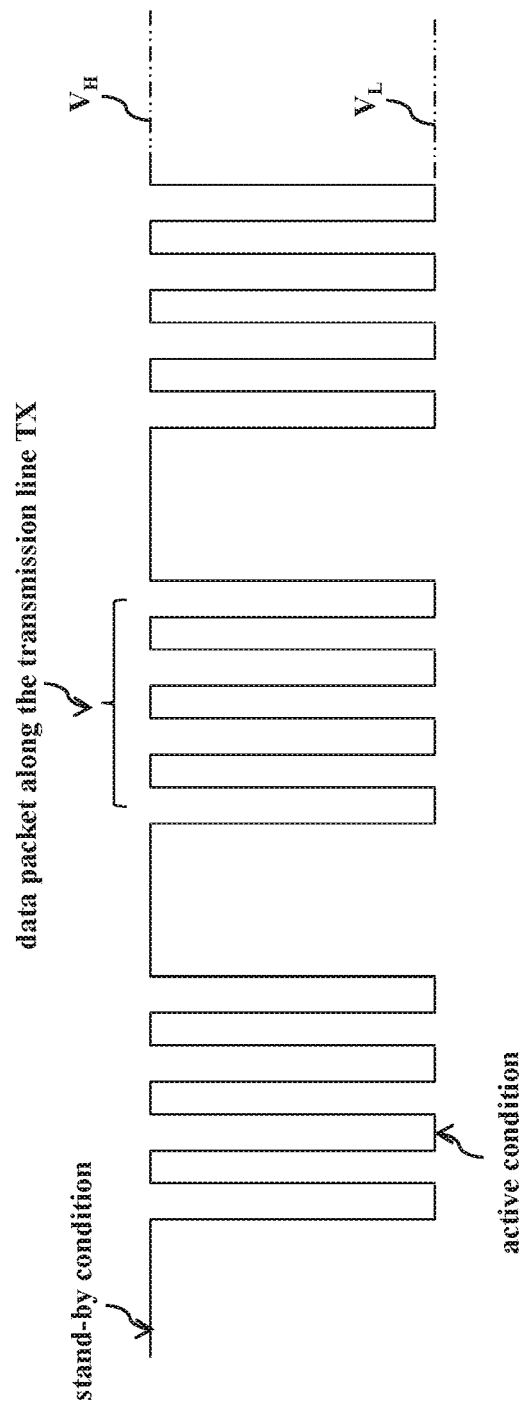
FIGS. 4-5 show schematic views related to the operation of the transceiver device, according to the invention.

As the communication bus 103 is of the serial type, data packets are conveniently transmitted along the above-mentioned communication lines as sequences of voltage pulses configured in accordance with the adopted communication protocol (FIG. 4).

Preferably, the serial communication bus 103 adopts a communication protocol according to which, in operation, each communication line takes a high-level voltage value VH (e.g. 3.3 V), when it is in a stand-by condition, or a low-level voltage value VL (e.g. 0 V), when it is in an active condition (FIG. 4).

For the sake of clarity, it is specified that a communication line (transmission or reception line) of a communication bus is in a stand-by condition when no voltage pulses are transmitted along it and is in an active condition when a voltage pulse is transmitted along it (FIG. 4).

Preferably, the serial communication bus 103 adopts a communication protocol of the UART type. Conveniently, the communication bus 103 may include bus converters or other arrangements of similar type (not shown) to suitably interface with the communication port 102 and the main control unit 101.

The protection and control device 100 may be installed on board a switching device 200 as shown in FIG. 1.

However, the protection and control device 100 may be also arranged as a stand-alone device, e.g. for installation on a switchboard panel.

Conveniently, the protection and control device 100 comprises or is operatively associated with a power supply unit 110 intended to feed said protection and control device, in particular the main control unit 100 thereof.

The power supply unit 110 conveniently comprises one or more current transformers 111 operatively associated with an electric line 150 (preferably electrically coupled with the switching device 200) and capable of harvesting electric power from this latter.

Preferably, in addition to the current transformers 111, the power supply arrangement 110 comprises an auxiliary power supply 112 capable of harvesting electric power from an auxiliary electric power source, for example a battery or a capacitor bank.

In general, most of the components of the protection and control device 100, as well as of the power supply unit 110 and of the switching device 200, may be of known type and will not be described in further details for the sake of brevity.

Figure 2:
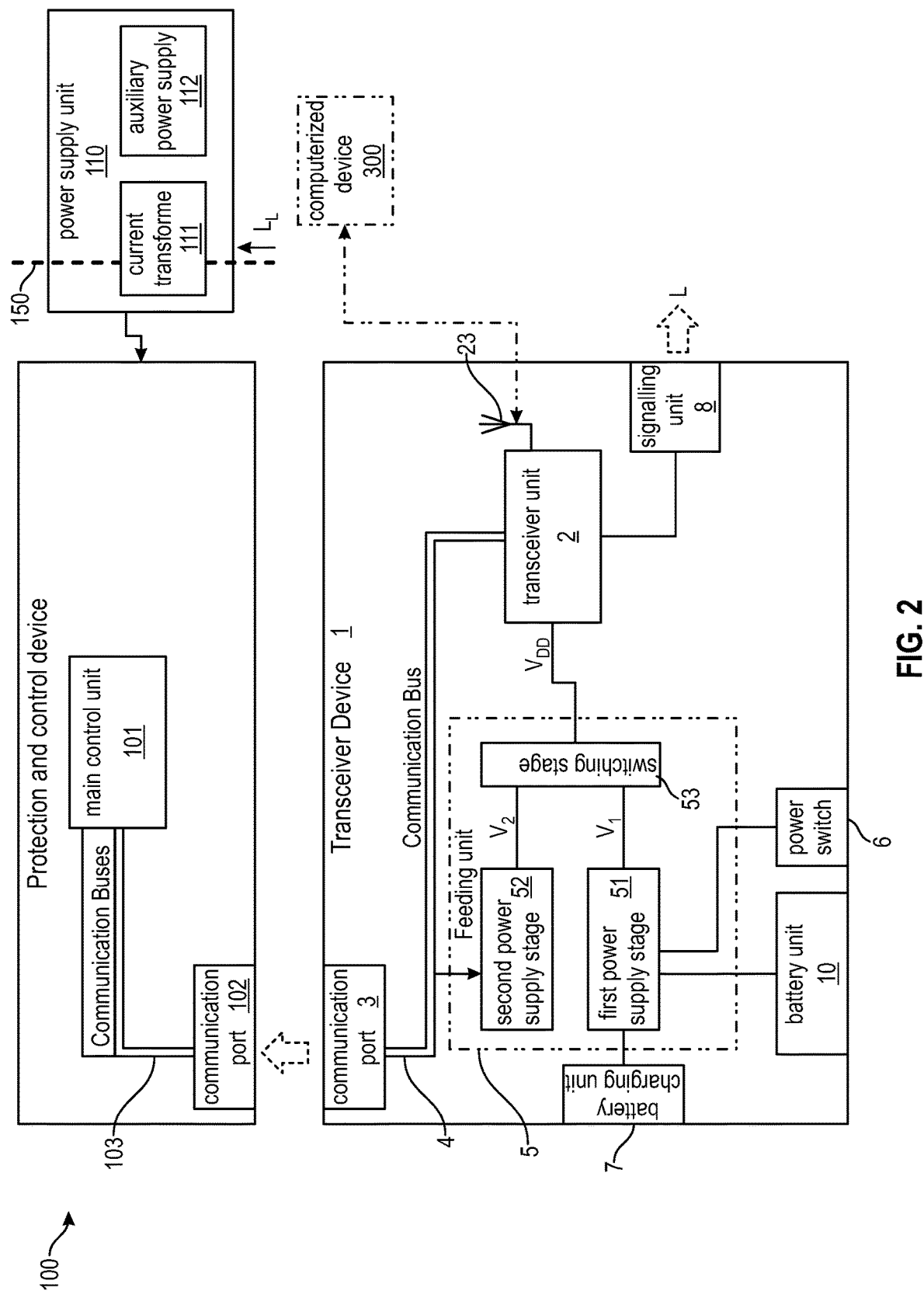
FIGS. 2-3 show schematic views of the transceiver device, according to the invention, when coupling with said protection and control device.
Figure 3:
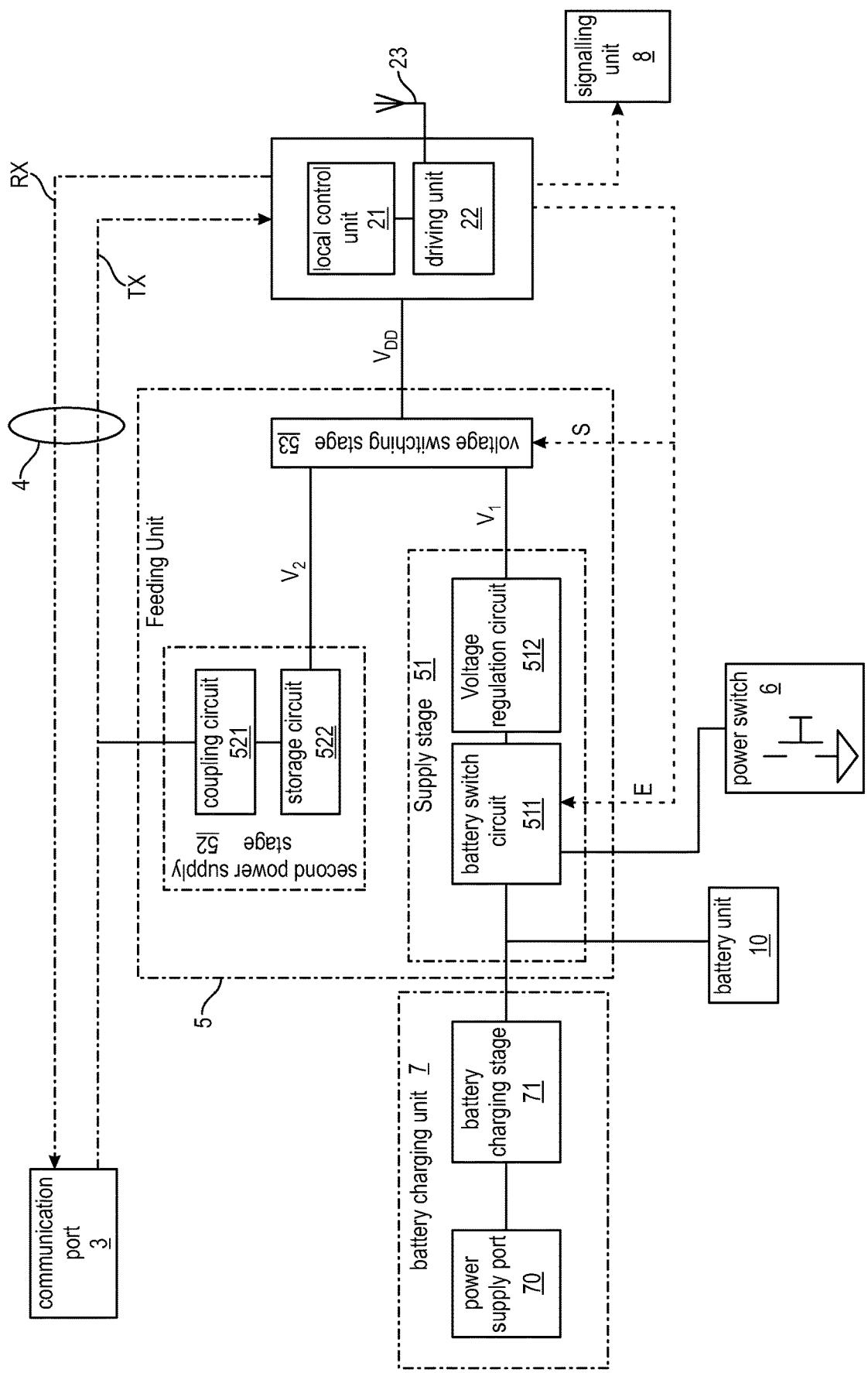

As indicated above, the transceiver device 1 is adapted to provide wireless connectivity to the protection and control device 100, in other words to allow this latter to communicate with an external computerized device 300 in a wireless manner (FIG. 2).

Preferably, the external computerised device 300 is of the mobile type. As an example, it may be a handheld or laptop computer, a tablet, a smartphone, or the like.

The transceiver device 1 comprises a transceiver unit 2 including a RF antenna 23.

Preferably, the transceiver unit 2 comprises a local control unit 21, which preferably includes digital data processing resources (e.g. microprocessors, DSPs or the like) capable of executing stored software instructions to carry out its functionalities.

Preferably, the transceiver unit 2 comprises a driving unit 22 controlled by said local control unit 21 to drive the RF antenna 23.

For the industrial implementation, the driving unit 22 and the RF antenna 23 may include suitable electronic circuits realized in accordance with well-established circuit designing techniques.

Preferably, the transceiver unit 2 adopts a near-field wireless communication protocol to communicate with the computerized device 300, for example a Bluetooth™ or ZigBee™ communication protocol.

The transceiver device 1 comprises a second serial communication port 3 and a second serial communication bus 4 electrically connected between the serial communication port 3 and the transceiver unit 2.

The communication port 3 is intended to be operatively coupled (i.e. mechanically and electrically coupled), preferably in a removable manner, with the corresponding serial communication port 102 of the protection and control device 100, when the transceiver device 1 is operatively coupled with said protection and control device.

To this aim, the communication port 3 conveniently comprises an interface connector 31, preferably a male connector, arranged at an external surface of the transceiver device 1. The interface connector 31 is mechanically and electrically coupleable, preferably in a removable manner, with the interface connector 102a of the communication port 102 of the protection and control device 100 (FIG. 1).

Preferably, the interface connector 31 is of the USB type.

Preferably, the communication port 3 includes a bus converter or other circuit arrangements of similar type (not shown) to suitably interface with the communication bus 4.

The communication bus 4 comprises a pair a distinct communication lines, namely a transmission line TX and a reception line RX (as seen from the communication port 3).

Also in this case, being the communication bus 4 is of the serial type, data packets are conveniently transmitted along the above-mentioned communication lines TX, RX in the form of sequences of voltage pulses configured in accordance with the adopted communication protocol (FIG. 4).

The serial communication bus 4 adopts a communication protocol according to which, in operation, each communication line takes a high-level voltage value VH (e.g. 3.3 V), when it is in a stand-by condition, i.e. no voltage pulses are transmitted through it, or a low-level voltage value VL (e.g. 0 V), when it is an active condition, i.e. a voltage pulse is transmitted through it.

Preferably, the serial communication bus 4 adopts a communication protocol of the UART type. Conveniently, the communication bus 4 may include bus converters or other arrangements of similar type (not shown) to suitably interface with the communication port 3 and the transceiver unit 2.

The transceiver device 1 comprises a battery unit 10 conveniently including one or more batteries, for example of the Li-ion type.

The transceiver device 1 further comprises a feeding unit 5 adapted to feed the transceiver unit 2 with a feeding voltage VDD.

Conveniently, the feeding unit 5 comprises a first power supply stage 51 electrically coupled with the battery unit 10 to harvest electric power from this latter.

According to the invention, the feeding unit 5 comprises a second power supply stage 52 electrically coupled with the transmission line TX of the serial communication bus 4 to harvest electric power from said transmission line, when this latter is in a stand-by condition and takes a high-level voltage value VH.

The second power supply stage 52 allows using the transmission line TX of the communication bus 4 as an auxiliary power supply to feed the transceiver unit 2 in substitution of the battery unit 10.

The second power supply stage 52 thus allows employing the electric energy, which is supplied by the control unit 101 of the control and protection device 100 to communicate with the transceiver unit 2 through the communication bus 4, to feed the transceiver unit 2 itself. In this way, the battery unit 10 can be used for shorter time intervals, which results in an extension of its useful operating life.

It is noted that the electric power supply formed by the transmission line TX of the communication bus 4 is not a continuous power supply source. The transmission line TX can work as an auxiliary power supply to feed the transceiver unit 2 only when it takes a high-level voltage value VH, i.e. it receives a sufficient level of electric power from the control unit 101 of the control and protection device 100.

However, the arrangement of such a non-continuous auxiliary power supply allows obtaining a feeding voltage VDD having a suitable average voltage value to feed the transceiver unit 2. This allows optimizing the management of the battery unit 10 and, consequently, obtaining a remarkable extension of the operating life (with respect to similar devices of the state of the art) for the transceiver device 1.

According to an aspect of the invention, the feeding unit 5 comprises a voltage switching stage 53 electrically connected with the first and second power supply stages 51, 52. The voltage switching stage 53 is adapted to receive the first and second voltages V1, V2 from the first and second power supply stages 51, 52 and select the first voltage V1 or the second voltage V2 as the feeding voltage VDD to be used for feeding the transceiver unit 2.

According to an aspect of the invention, the transceiver unit 2 is adapted to make the voltage switching stage 53 to select the first voltage V1 or the second voltage V2 depending on an average value taken by the feeding voltage VDD received by said transceiver unit.

Preferably, the transceiver unit 2 checks whether the average value of the feeding voltage VDD received from the voltage switching stage 53 is lower than a given threshold value.

Preferably, the transceiver unit 2 makes the voltage switching stage 53 to select the second voltage V2 as the feeding voltage VDD, if the average value of the received feeding voltage VDD is not lower than said threshold value.

Preferably, the transceiver unit 2 makes the voltage switching stage 53 to select the first voltage V1 as the feeding voltage VDD, if the average value of the received feeding voltage VDD is lower than said threshold value.

Thanks to the above-described technical solution, the transceiver unit 2 can be normally fed by the transmission line TX and it can be fed by the battery unit 100 only when said transmission line is not capable of providing a suitable level of electric power for any reason (e.g. because it is permanently in an active condition).

According to an aspect of the invention, the transceiver unit 2 is adapted to make the voltage switching stage 53 to select the first voltage V1 or the second voltage V2 depending also on the operating conditions of the protection and control device 100.

Preferably, the transceiver unit 2 acquires status information on the operating conditions of the protection and control device 100. Such a status information may be obtained by sending suitable query messages to the main control unit 101 of the protection and control device 100 through the communication buses 103, 4.

Preferably, based on said status information, the transceiver unit 2 checks whether the protection and control device is fed by the current transformers 111 operatively associated to the electric line 150 or by the auxiliary power supply 112.

Preferably, the transceiver unit 2 causes the voltage switching stage 53 to select the second voltage V2 as the feeding voltage VDD, if the protection and control device 100 is fed by the auxiliary power supply 112. In this case, in fact, the protection and control device 100 is certainly sufficiently fed by its power supply unit 110.

Preferably, based on said status information, the transceiver unit 2 checks the value of the line current IL flowing along the electric line 150, if the protection and control device 100 is fed by the current transformers 111. In this way, the transceiver unit 2 can check whether the protection and control device 100 is sufficiently fed by its power supply 110, even if an auxiliary power supply 112 is not available for any reason (e.g. because it is not installed or due to a fault).

Preferably, the transceiver unit 2 causes the voltage switching stage 53 to select the second voltage V2 as the feeding voltage VDD, if the value of the line current IL is not lower than a given threshold current value.

Preferably, the transceiver unit 2 causes the voltage switching stage 53 to select the first voltage V1 as the feeding voltage VDD, if the value of the line current IL is lower than a given threshold current value.

Thanks to the above-described technical solution, the transceiver unit 2 can be fed by the transmission line TX only when said protection and control device is properly fed by its power supply unit 110. In practice, no electric power is drawn from the power and control device 100 (through the transmission line TX) to feed the transceiver unit 2 when said protection and control device does not receive a sufficient level of electric power from its power supply unit 110. According to an embodiment of the invention, the voltage switching stage 53 is adapted to select the highest of the first and second voltages V1, V2 as the feeding voltage VDD to be used for feeding the transceiver unit 2.

In this case, in an industrial implementation of the invention, the voltage switching stage 53 may comprise a selection circuit including a pair of diodes, each having a cathode terminal receiving the first voltage V1 or the second voltage V2 and the anode terminal coupled to form a common voltage output. As an alternative, an integrated switch circuit may be used.

Preferably, the transceiver unit 2 is adapted to cause the electrical disconnection or connection of the battery unit 10 from the power supply stage 51 depending on the average value (calculated over a suitable time period) of the feeding voltage VDD. In this way, the voltage switching stage 53 is forced to select the first voltage V1 or the second voltage V2 depending on the average value of the voltage VDD received by said transceiver unit Preferably, the transceiver unit 2 checks whether the average value of the voltage VDD is lower than a given threshold voltage value.

Preferably, the transceiver unit 2 causes the electrical disconnection of the battery unit 10 from the first power supply stage 51, if the average value of the voltage VDD is not lower than said threshold value. In this way, the first power supply stage 51 provides a first voltage V1 having unsuitable values (virtually 0 V) as it is not fed by the battery unit 10 and the voltage switching stage 53 is forced to select the second voltage V2 as the feeding voltage VDD for feeding the transceiver unit 2.

Preferably, the transceiver unit 2 causes the electrical connection of the battery unit 10 with the first power supply stage 51, if the average value of the voltage VDD is lower than said threshold voltage value. In this way, the first power supply stage 51 provides a first voltage V1 having suitable feeding values as it is fed by the battery unit 10 and the voltage switching stage 53 is forced to select the first voltage V1 as the feeding voltage VDD for feeding the transceiver unit 2.

Preferably, the transceiver unit 2 is adapted to cause the electrical disconnection or connection of the power supply stage 51 from the battery unit 10 depending on the operating conditions of the power and control device 100. In this way, the voltage switching stage 53 is forced to select the first voltage V1 or the second voltage V2 depending on the operating conditions of the power and control device 100.

Preferably, the transceiver unit 2 acquires information on the operating conditions of the protection and control device 100 and checks whether the protection and control device is fed by the current transformers 111 or by the auxiliary power supply 112.

Preferably, the transceiver unit 2 causes the electrical disconnection of the battery unit 10 from the first power supply stage 51, if the protection and control device 100 is fed by the auxiliary power supply 112. In this way, the voltage switching stage 53 is forced to select the second voltage V2 as the feeding voltage VDD for feeding the transceiver unit 2.

Preferably, the transceiver unit 2 checks the value of the line current IL flowing along the electric line 150, if the protection and control device 100 is fed by the current transformers 111.

Preferably, the transceiver unit 2 causes the electrical disconnection of the battery unit 10 from the first power supply stage 51, if the value of the line current IL is not lower than a given threshold current value. In this way, the voltage switching stage 53 is forced to select the second voltage V2 as the feeding voltage VDD for feeding the transceiver unit 2.

Preferably, the transceiver unit 2 causes the electrical connection of the battery unit 10 with the first power supply stage 51, if the value of the line current IL is lower than a given threshold current value. In this way, the voltage switching stage 53 is forced to select the first voltage V1 as the feeding voltage VDD for feeding the transceiver unit 2.

According to another embodiment of the invention, the voltage switching stage 53 is adapted to select the first voltage V1 or said second voltage V2 as the feeding voltage VDD in response to selection signals S received from the transceiver unit 2.

In this case, in an industrial implementation of the invention, the voltage switching stage 53 may comprise a multiplexing circuit or an integrated switch circuit controlled by the selection signals provided and transceiver unit 2.

Preferably, the transceiver unit 2 is adapted to provide the selection signals S to the voltage switching stage 53 depending on the average value of the feeding voltage VDD.

Preferably, the transceiver unit 2 checks whether the average value of the voltage VDD is lower than a given threshold voltage value.

Preferably, the transceiver unit 2 provides selection signals S to select the second voltage V2 as the feeding voltage VDD, if the average value of the voltage VDD is not lower than said threshold value. Preferably, the transceiver unit 2 provides selection signals S to select the first voltage V1 as the feeding voltage VDD for feeding the transceiver unit 2, if the average value of the voltage VDD is lower than said threshold value.

Preferably, the transceiver unit 2 is adapted to provide the selection signals S to the voltage switching stage 53 depending on the operating conditions of the protection and control device 100. Preferably, the transceiver unit 2 acquires information on the operating conditions of the protection and control device 100 and checks whether the protection and control device is fed by the current transformers 111 or by the auxiliary power supply 112.

Preferably, the transceiver unit 2 provides selection signals S to select the second voltage V2 as the feeding voltage VDD, if the protection and control device 100 is fed by the auxiliary power supply 112.

Preferably, the transceiver unit 2 checks the value of the line current IL flowing along the electric line 150, if the protection and control device 100 is fed by the current transformers 111.

Preferably, the transceiver unit 2 provides selection signals S to select the second voltage V2 as the feeding voltage VDD, if the value of the line current IL is not lower than a given threshold current value.

Preferably, the transceiver unit 2 provides selection signals S to select the first voltage V1 as the feeding voltage VDD, if the value of the line current IL is lower than said threshold current value. The above-described technical solutions provided by the invention allow remarkably improving the reliability of the transceiver device 1 as they ensure that the transceiver unit 2 is always efficiently fed either by the battery unit 10 or by the transmission line TX.

According to an aspect of the invention, the transceiver device 1 comprises a power switch 6 that can be operated by a user between a switch-on position, at which said transceiver device is activated (i.e. switched-on), and a switch-off position, at which said transceiver device is deactivated (i.e. switched-off).

According to an aspect of the invention, the first power supply stage 51 comprises a battery switch circuit 511 electrically connected with the battery unit 10 and a voltage regulation circuit 512 electrically coupled between the battery switch circuit 511 and the voltage switching stage 53.

The battery switch circuit 511 is adapted to electrically connect or isolate the battery unit 10 with or from the power supply stage 51.

The voltage regulation circuit 512 is adapted to regulate the power supply voltage received from the battery unit 10 and provide the voltage switching stage 53 with a first voltage V1 having suitable values.

Conveniently, in an industrial implementation of the invention, the battery switch circuit 511 may comprise an integrated switch circuit whereas the voltage regulation circuit 512 comprises a LDO (low-dropout) regulator.

Preferably, the battery switch circuit 511 is adapted to electrically connect or disconnect the battery unit 10 with or from the power supply stage 51 (more particularly the regulating stage 512) in response to enabling signals E received from the transceiver unit 2.

In this way, the transceiver unit 2 may selectively connects or disconnects the battery unit 10 from the downstream circuits, during selected intervals of its operating life.

As an example, the transceiver unit 2 may provide enabling signals E to connect or disconnect the battery unit 10 from the power supply stage 51 in order to cause the voltage switching circuit 53 to select the first voltage V1 or the second voltage V2 as the feeding voltage VDD to be used for feeding the transceiver unit 2.

As a further example, the transceiver unit 2 may provide enabling signals E to disconnect the battery unit 10 from the downstream circuits in order during charging process of the battery unit 10 or reduce current leakages.

Preferably, the power switch 6 enables the battery switch circuit 511 to electrically connect the battery unit 10 with the power supply stage 51 (more particularly with the regulating stage 512), when it is operated from said switch-off position to said switch-on position.

In this way, the power switch 6 makes the voltage switching stage 53 to select the first voltage V1 as the feeding voltage VDD, when the power switch 6 is operated from said switch-off position to said switch-on position.

At the start-up, the transceiver unit 2 can thus be fed by the battery unit 10, i.e. by a stable electric power source, and does not need to interact with the voltage switching stage 53 to manage the feeding voltage VDD. Therefore, possible malfunctions linked to the booting of the transceiver unit 2 are avoided and the operating reliability of the transceiver device 1 is further improved.

According to an aspect of the invention, the transceiver device 1 comprises a battery charging unit 7 to charge the battery unit 10.

Preferably, the battery charging unit 7 comprises a power supply port 70 electrically coupleable with an external electric power source. As an example, the power supply port 70 may include a DC power jack electrically coupleable to an external electronic charging device.

Preferably, the battery charging unit 7 comprises a battery charging stage 71 electrically coupled with the battery unit 10 (preferably through the battery switch circuit 511) and with the power supply port 70. In this way, the battery unit 10 of the transceiver device 10 may be advantageously charged to ensure a suitable power supply level.

According to an aspect of the invention, the second power supply stage 52 comprises a coupling circuit 521 electrically connected with the transmission line TX of the serial communication bus 4 and a storage circuit 522 electrically connected between the coupling circuit 521 and the voltage switching stage 53.

The coupling circuit 521 is adapted to harvest electric power from the transmission line TX, when this latter takes a high-level voltage value VH whereas the voltage regulation circuit 512 is adapted to provide the voltage switching stage 53 with a second voltage V2 having suitable values.

Conveniently, in an industrial implementation of the invention, the coupling circuit 521 may comprise a suitably configured diode circuit whereas the storage circuit 522 may comprise a suitably configured capacitive circuit.

According to an aspect of the invention, the transceiver device 1 comprises a signalling unit 8 to provide light signals L indicative of the operating status of said transceiver device and, possibly, of the protection and control device 100.

Preferably, the signalling unit 8 comprise a LED device suitably driven by the transceiver unit 2. Preferably, the signalling unit 8 provides different light signals (e.g. having different blinking frequencies or colors) depending on the signalling information to be provided in output.

As an example, the signalling unit 8 may provide a first light signal having a first blinking frequency to signal that the transceiver device is activated and properly working, a second light signal having a second blinking frequency to signal that the protection and control device 10 is activated and properly working and a third continuous light signal to signal that the battery charging circuit 513 is charging the battery unit 10.

Obviously, additional operating variants may be arranged according to the needs.

According to important aspects of the invention, the transceiver unit 2 is adapted to carry out control procedures aimed at managing the interaction with the control unit 101 of the control and protection device 100 and with an external computerised device 300 in such a way to prevent an excessive discharge of the battery unit 10.

Preferably, the transceiver unit 2 is adapted to carry out a first control procedure P1 including the following steps:

receiving a query message Q to be transmitted to the protection and control device 100 by an external computerised device 300;

checking whether the length of a response message R to be transmitted to the external electronic device 300 in response to the query message Q;

if the length of said response message R is longer than a given threshold length, dividing the query message Q in a plurality of sub-query messages Q1, Q2, Q3 separated by corresponding time intervals;

transmitting the sub-query messages Q1, Q2, Q3 to the protection and control device 100 in substitution of the query message Q received from the external electronic device 300.

Figure 5:
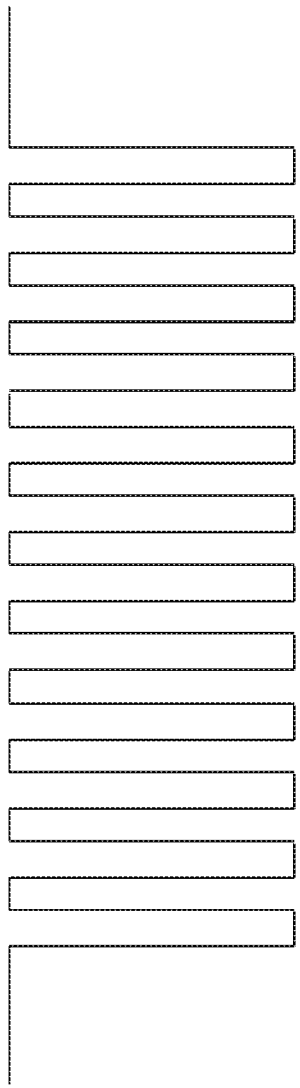
Figure 5:
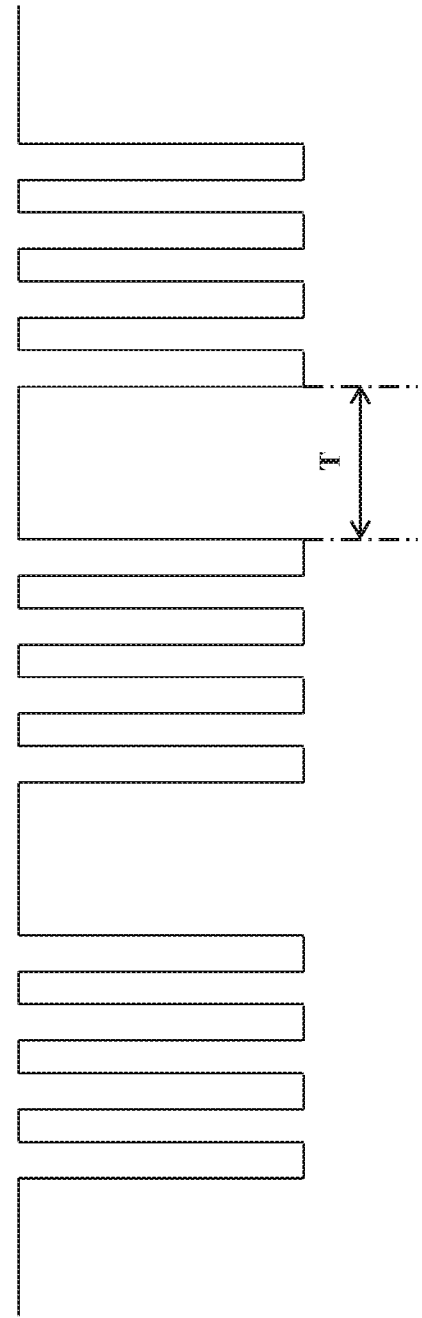

By means of the control procedure P1, the transceiver unit 2 divides the query messages Q received from an external control device 300 into smaller data packets Q1, Q2, Q3 separated by suitable time intervals and transmit said data packets to the main control unit 101 of protection and control device 100 (FIG. 5).

In response to the above mentioned sub-query messages Q1-Q3, the main control unit 101 of protection and control device 100 transmits data packets of relatively small size and separated by suitable time intervals T.

In this way, the transmission line TX of the communication bus does not take a low-level voltage value VL for long time intervals. As a consequence, the battery unit 10 is not forced to intervene to feed the transceiver unit 2 for long time intervals and an excessive discharge of this latter is prevented.

Preferably, the transceiver unit 2 is adapted to carry out a second control procedure P2 including the following steps:

receiving one or more data packets to be transmitted to the external computerised device 300 by the protection and control device 100;

storing the received data packets in a memory;

checking the operating status the transmission line TX of the communication bus 4;

transmitting the stored data packets to an external electronic device 300, if the transmission line TX of the serial communication bus 4 stably remains in a stand-by condition, thereby taking a high-level voltage level VH;

repeating the previous steps, if the transmission line TX of the serial communication bus 4 does not stably remain in said stand-by condition.

By means of the control procedure P2, the transceiver unit 2 regulates the transmission of data packets towards the external control device 300 in such a way that said data transmission (which is power consuming) occurs only when the transceiver unit 2 is fed by the transmission line TX of the communication bus 4. As a consequence, the battery unit 10 is prevented from an excessive discharge.

The transceiver device, according to the invention, allows achieving the intended aim and objects. The transceiver device, according to the invention, is equipped with an innovative feeding arrangement, which allows to prolong the useful operating life of the on-board battery unit. In this way, the transceiver device can efficiently operate for prolonged periods of time.

The transceiver device, according to the invention, can be easily interfaced with protection and control device of different types without requiring a specific re-design of these latter.

The transceiver device of the invention may be conveniently used as a piece of hardware (dongle) intended to be removably connected with the protection and control device 100 as a commonly available USB key.

Preferably, the transceiver device 100 is arranged to have a male connector 31 mechanically and electrically coupleable, in a removable manner, with a corresponding female connector 102*a* of the protection and control device. The transceiver device, according to the invention, can be manufactured at industrial level with commonly available electronic circuit manufacturing techniques, thereby with very competitive industrial costs.

The invention claimed is:

1. A transceiver device operatively coupleable with a protection and control device for electric power distribution systems to provide wireless connectivity to said protection and control device, said transceiver device comprising:

a transceiver unit including a RF antenna;

a serial communication port operatively coupleable with a further corresponding serial communication port of said protection and control device;

a serial communication bus electrically connected between said serial communication port and said transceiver unit, said serial communication bus having a transmission line and a reception line, in operation said transmission line taking a high-level voltage value, when said transmission line is in a stand-by condition, and a low-level voltage value, when said transmission is in an active condition;

a battery unit;

a feeding unit adapted to feed said transceiver unit with a feeding voltage, said feeding unit comprising a first power supply stage electrically coupled with said battery unit to harvest electric power from said battery unit and a second power supply stage electrically coupled with the transmission line of said serial communication bus to harvest electric power from said transmission line, when said transmission line is in said stand-by condition and takes said high-level voltage value;

wherein said feeding unit comprises a voltage switching stage electrically connected with said first and second power supply stages to receive a first voltage from said first power supply stage and a second voltage from said second power supply stage, said voltage switching stage being adapted to select said first voltage or said second voltage as said feeding voltage to feed said transceiver unit;

wherein said transceiver unit is adapted to make said voltage switching stage to select said first voltage or said second voltage depending on an average value taken by the feeding voltage received by said transceiver unit; and wherein said transceiver unit is adapted to:

check the average value of said feeding voltage received from said voltage switching stage, make said voltage switching stage to select said second voltage as said feeding voltage, if the average value of said feeding voltage is not lower than a threshold voltage value, and make said voltage switching stage to select said first voltage as said feeding voltage, if the average value of said feeding voltage is lower than said threshold voltage value.

2. The transceiver device, according to claim 1, wherein said transceiver unit is adapted to make said voltage switching stage to select said first voltage or said second voltage depending on the operating conditions of said protection and control device.

3. The transceiver device, according to claim 2, wherein said transceiver unit is adapted to:

acquire information on the operating conditions of said protection and control device;

check whether said protection and control device is fed by one or more current transformers operatively associated to an electric line or by an auxiliary power supply;

make said voltage switching stage to select said second voltage as said feeding voltage, if said protection and control device is fed by said auxiliary power supply;

check the value of a line current flowing along said electric line, if said protection and control device is fed by said current transformers;

make said voltage switching stage to select said second voltage as said feeding voltage, if the value of said line current is not lower than a threshold current value;

make said voltage switching stage to select said first voltage as said feeding voltage, if the value of said line current is lower than a threshold current value.

4. The transceiver device, according to claim 1, wherein said voltage switching stage is adapted to select the highest of the first and second voltages as said feeding voltage to be used for feeding said transceiver unit.

5. The transceiver, according to claim 1, wherein said voltage switching stage is adapted to select said first voltage or said second voltage in response to selection signals received from said transceiver unit.

6. The transceiver device, according to claim 1, wherein said first power supply stage comprises a battery switch circuit electrically coupled with said battery unit and a voltage regulation circuit electrically coupled between said battery switch circuit and said voltage switching stage, said battery switch circuit being adapted to electrically connect or disconnect said battery unit with or from said first power supply stage.

7. The transceiver device, according to claim 6, wherein said battery switch circuit electrically connects or disconnects said battery unit with or from said voltage regulation circuit in response to enabling signals received from said transceiver unit.

8. The transceiver device, according to claim 1, further comprising a power switch that is operable by a user between a switch-on position, at which said transceiver device is activated, and a switch-off position, at which said transceiver device is deactivated.

9. The transceiver device, according to claim 6, wherein said power switch enables said battery switch circuit to electrically connect said battery unit with said first power supply stage, when said power switch is operated from said switch-off position to said switch-on position.

10. The transceiver device, according to claim 1, further comprising a signalling unit to provide light signals indicative of the operating status of said transceiver device and/or of said protection and control device.

11. The transceiver device, according to claim 1, wherein said transceiver unit is adapted to carry out a first control procedure including:
receive a query message to be transmitted to said protection and control device from an external computerised device;
check whether the length of a response message to be transmitted to said external computerised device in response to said query message;
if the length of said response message is longer than a given threshold length, divide said query message in a plurality of sub-query messages;
transmit said plurality of sub-query messages to said protection and control device in substitution of the query message received from said external computerised device.

12. The transceiver device, according to claim 1, wherein said transceiver unit is adapted to carry out a second control procedure including:
receive one or more data packets to be transmitted to said computerised electronic device from said protection and control device;
store the received data packets in a memory;
check the operating status the transmission line of said serial communication bus;
transmit the stored data packets to said computerised device, if the transmission line of said serial communication bus stably remains in a stand-by condition;
repeat the previous steps, if the transmission line of said serial communication bus does not stably remain in a stand-by condition.

13. The transceiver device of claim 1 further comprising the protection and control device operatively coupled with the transceiver device.

14. The transceiver device, according to claim 4, wherein said transceiver unit is adapted to make said voltage switching stage to select said first voltage or said second voltage depending on the operating conditions of said protection and control device.

15. The transceiver device, according to claim 5, wherein said transceiver unit is adapted to make said voltage switching stage to select said first voltage or said second voltage depending on the operating conditions of said protection and control device.

16. The transceiver device, according to claim 5, wherein said voltage switching stage is adapted to select the highest of the first and second voltages as said feeding voltage to be used for feeding said transceiver unit.

17. The transceiver device, according to claim 6, wherein said voltage switching stage is adapted to select the highest of the first and second voltages as said feeding voltage to be used for feeding said transceiver unit.

18. A transceiver device operatively coupleable with a protection and control device for electric power distribution systems to provide wireless connectivity to said protection and control device, said transceiver device comprising:
a transceiver unit including a RF antenna;
a serial communication port operatively coupleable with a further corresponding serial communication port of said protection and control device;
a serial communication bus electrically connected between said serial communication port and said transceiver unit, said serial communication bus having a transmission line and a reception line, in operation said transmission line taking a high-level voltage value, when said transmission line is in a stand-by condition, and a low-level voltage value, when said transmission is in an active condition;
a battery unit; and
a feeding unit adapted to feed said transceiver unit with a feeding voltage, said feeding unit comprising a first power supply stage electrically coupled with said battery unit to harvest electric power from said battery unit and a second power supply stage electrically coupled with the transmission line of said serial communication bus to harvest electric power from said transmission line, when said transmission line is in said stand-by condition and takes said high-level voltage value;
wherein said feeding unit comprises a voltage switching stage electrically connected with said first and second power supply stages to receive a first voltage from said first power supply stage and a second voltage from said second power supply stage, said voltage switching stage being adapted to select said first voltage or said second voltage as said feeding voltage to feed said transceiver unit; and
wherein said voltage switching stage is adapted to select said first voltage or said second voltage in response to selection signals received from said transceiver unit.

19. A transceiver device operatively coupleable with a protection and control device for electric power distribution systems to provide wireless connectivity to said protection and control device, said transceiver device comprising:
a transceiver unit including a RF antenna;

a serial communication port operatively coupleable with a further corresponding serial communication port of said protection and control device;
a serial communication bus electrically connected between said serial communication port and said transceiver unit, said serial communication bus having a transmission line and a reception line, in operation said transmission line taking a high-level voltage value, when said transmission line is in a stand-by condition, and a low-level voltage value, when said transmission is in an active condition;
a battery unit; and
a feeding unit adapted to feed said transceiver unit with a feeding voltage, said feeding unit comprising a first power supply stage electrically coupled with said battery unit to harvest electric power from said battery unit and a second power supply stage electrically coupled with the transmission line of said serial communication bus to harvest electric power from said transmission line, when said transmission line is in said stand-by condition and takes said high-level voltage value;
wherein said first power supply stage comprises a battery switch circuit electrically coupled with said battery unit and a voltage regulation circuit electrically coupled between said battery switch circuit and said voltage switching stage, said battery switch circuit being adapted to electrically connect or disconnect said battery unit with or from said first power supply stage; and
wherein said battery switch circuit electrically connects or disconnects said battery unit with or from said voltage regulation circuit in response to enabling signals received from said transceiver unit.

20. A transceiver device operatively coupleable with a protection and control device for electric power distribution systems to provide wireless connectivity to said protection and control device, said transceiver device comprising:
a transceiver unit including a RF antenna;
a serial communication port operatively coupleable with a further corresponding serial communication port of said protection and control device;
a serial communication bus electrically connected between said serial communication port and said transceiver unit, said serial communication bus having a transmission line and a reception line, in operation said transmission line taking a high-level voltage value, when said transmission line is in a stand-by condition, and a low-level voltage value, when said transmission is in an active condition;
a battery unit; and
a feeding unit adapted to feed said transceiver unit with a feeding voltage, said feeding unit comprising a first power supply stage electrically coupled with said battery unit to harvest electric power from said battery unit and a second power supply stage electrically coupled with the transmission line of said serial communication bus to harvest electric power from said transmission line, when said transmission line is in said stand-by condition and takes said high-level voltage value;
wherein said first power supply stage comprises a battery switch circuit electrically coupled with said battery unit and a voltage regulation circuit electrically coupled between said battery switch circuit and said voltage switching stage, said battery switch circuit being adapted to electrically connect or disconnect said battery unit with or from said first power supply stage; and
wherein said power switch enables said battery switch circuit to electrically connect said battery unit with said first power supply stage, when said power switch is operated from said switch-off position to said switch-on position.

21. A transceiver device operatively coupleable with a protection and control device for electric power distribution systems to provide wireless connectivity to said protection and control device, said transceiver device comprising:
a transceiver unit including a RF antenna;
a serial communication port operatively coupleable with a further corresponding serial communication port of said protection and control device;
a serial communication bus electrically connected between said serial communication port and said transceiver unit, said serial communication bus having a transmission line and a reception line, in operation said transmission line taking a high-level voltage value, when said transmission line is in a stand-by condition, and a low-level voltage value, when said transmission is in an active condition;
a battery unit; and
a feeding unit adapted to feed said transceiver unit with a feeding voltage, said feeding unit comprising a first power supply stage electrically coupled with said battery unit to harvest electric power from said battery unit and a second power supply stage electrically coupled with the transmission line of said serial communication bus to harvest electric power from said transmission line, when said transmission line is in said stand-by condition and takes said high-level voltage value;
wherein said transceiver unit is adapted to carry out a first control procedure including:
receive a query message to be transmitted to said protection and control device from an external computerised device;
check whether the length of a response message to be transmitted to said external computerised device in response to said query message;
if the length of said response message is longer than a given threshold length, divide said query message in a plurality of sub-query messages;
transmit said plurality of sub-query messages to said protection and control device in substitution of the query message received from said external computerised device.

22. A transceiver device operatively coupleable with a protection and control device for electric power distribution systems to provide wireless connectivity to said protection and control device, said transceiver device comprising:
a transceiver unit including a RF antenna;
a serial communication port operatively coupleable with a further corresponding serial communication port of said protection and control device;
a serial communication bus electrically connected between said serial communication port and said transceiver unit, said serial communication bus having a transmission line and a reception line, in operation said transmission line taking a high-level voltage value, when said transmission line is in a stand-by condition, and a low-level voltage value, when said transmission is in an active condition;
a battery unit; and
a feeding unit adapted to feed said transceiver unit with a feeding voltage, said feeding unit comprising a first power supply stage electrically coupled with said battery unit to harvest electric power from said battery unit and a second power supply stage electrically coupled with the transmission line of said serial communication bus to harvest electric power from said transmission line, when said transmission line is in said stand-by condition and takes said high-level voltage value; and wherein said transceiver unit is adapted to carry out a second control procedure including:

receive one or more data packets to be transmitted to said computerised electronic device from said protection and control device, store the received data packets in a memory, check the operating status the transmission line of said serial communication bus, transmit the stored data packets to said computerised device, if the transmission line of said serial communication bus stably remains in a stand-by condition, and repeat the previous steps, if the transmission line of said serial communication bus does not stably remain in a stand-by condition.

* * * * *